(12) United States Patent
Kumai et al.

(10) Patent No.: US 6,819,642 B2
(45) Date of Patent: Nov. 16, 2004

(54) DATA RECORDING DEVICE, DATA REPRODUCING DEVICE, AND OPTICAL DISC

(75) Inventors: Satoshi Kumai, Kanagawa (JP); Tetsuji Kawashima, Kanagawa (JP); Eiji Kumagai, Kanagawa (JP); Kenji Nagashima, Kanagawa (JP); Toshio Morizumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 09/813,500

(22) Filed: Mar. 21, 2001

(65) Prior Publication Data

US 2001/0024410 A1 Sep. 27, 2001

(30) Foreign Application Priority Data

Mar. 24, 2000 (JP) .................................... P2000-088600

(51) Int. Cl.[7] ................................................. G11B 7/00
(52) U.S. Cl. ................. 369/47.24; 369/53.2; 369/59.14
(58) Field of Search ............................ 369/47.19, 47.2, 369/47.21, 47.23, 47.24, 47.32, 47.33, 47.34, 47.39, 47.43, 53.11, 53.22, 53.31, 53.36, 53.37, 59.11, 59.13, 59.14, 59.24, 59.25, 59.27, 94, 275.3

(56) References Cited

U.S. PATENT DOCUMENTS

| | | | | |
|---|---|---|---|---|
| 4,680,764 A | * | 7/1987 | Suzuki et al. ................ 714/756 |
| 5,060,221 A | * | 10/1991 | Sako et al. ............... 369/59.25 |
| 5,732,088 A | * | 3/1998 | Sako ........................ 369/275.3 |
| 6,035,433 A | * | 3/2000 | Sako et al. ............... 369/53.35 |
| 6,243,354 B1 | * | 6/2001 | Terasaki et al. .......... 369/275.4 |
| 6,310,854 B1 | * | 10/2001 | Sato et al. ................ 369/275.3 |
| 6,393,203 B1 | * | 5/2002 | Ueno et al. .................... 386/98 |
| 6,654,328 B2 | * | 11/2003 | Kaku et al. .............. 369/53.26 |

* cited by examiner

Primary Examiner—Thang V. Tran
Assistant Examiner—Bach Vuong
(74) Attorney, Agent, or Firm—Jay H. Maioli

(57) ABSTRACT

In a CIRC encoder for carrying out error correction coding processing with a CIRC, a first interleaver and a second interleaver are provided which have different delay parameters, and these interleavers are switched in accordance with the recording density of an optical disc for recording data. Also, in a CIRC decoder, a first deinterleaver corresponding to the first interleaver and a second deinterleaver corresponding to the second interleaver are provided, and these deinterleavers are switched in accordance with the recording density of an optical disc for reproducing data. A recording/reproducing system is realized which is capable of carrying out appropriate recording and reproduction of data to and from an optical disc having a higher recording density can be carried out and is also capable of handling an optical disc of an existing format.

20 Claims, 5 Drawing Sheets

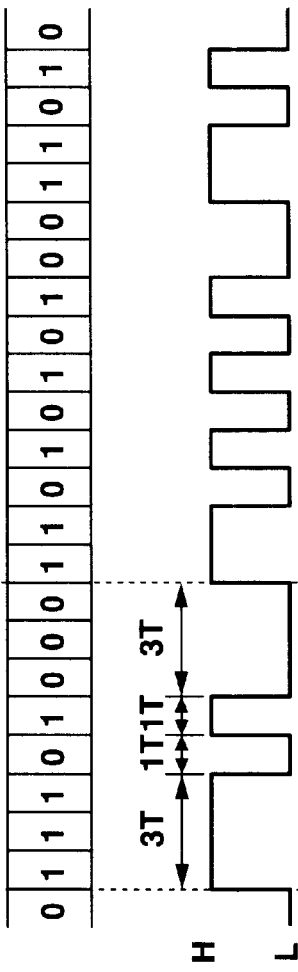
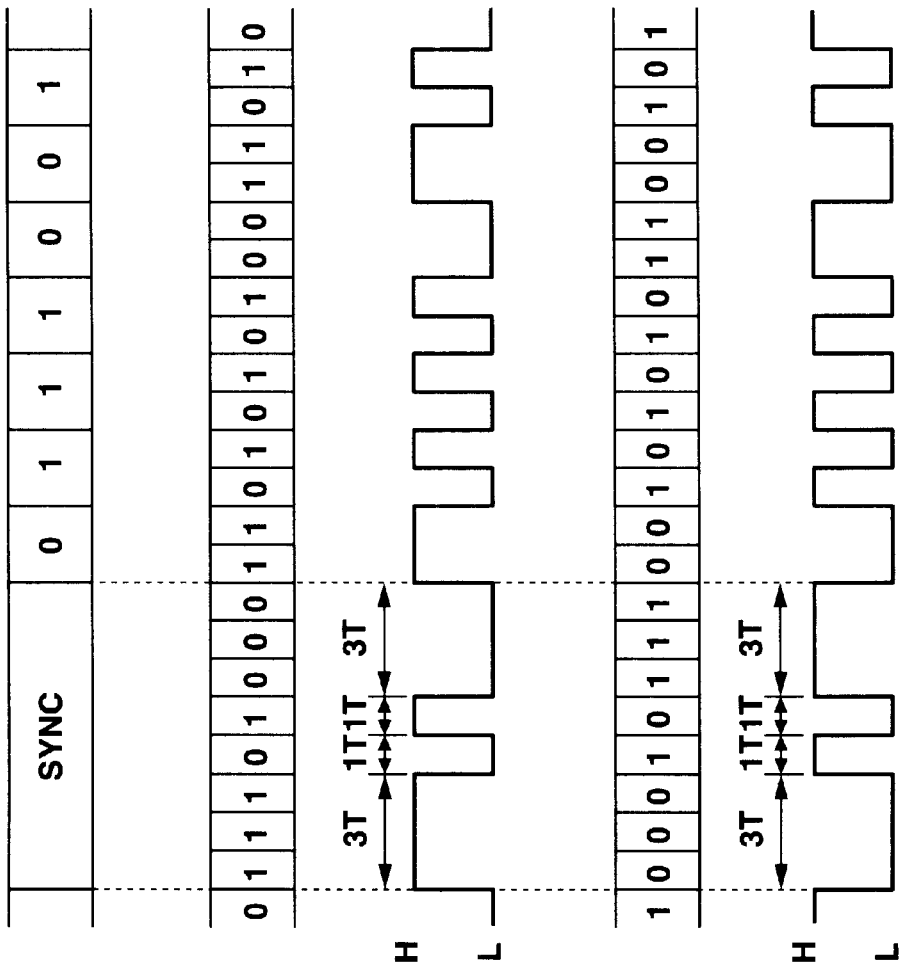
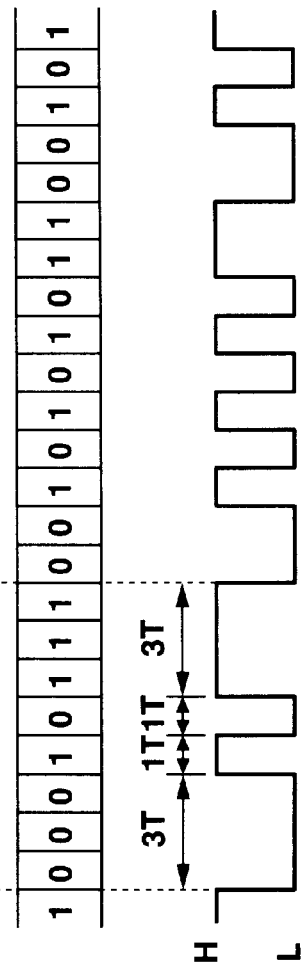

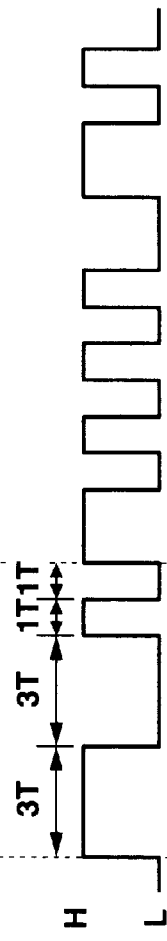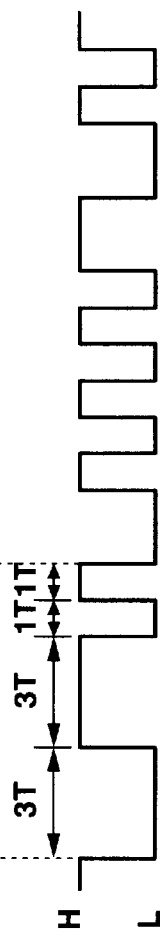

DATA RECORDING DEVICE, DATA REPRODUCING DEVICE, AND OPTICAL DISC

BACKGROUND OF THE INVENTION

1. Field of the Invention

This invention relates to a data recording device for carrying out recording of data onto an optical disc, a data reproducing device for carrying out reproduction of data recorded on an optical disc, and an optical disc in which a high recording density is realized.

2. Description of the Related Art

A CD (compact disc) system has been popularly used, which uses an optical disc with an outer diameter of about 120 mm and a thickness of about 1.2 mm as a recording medium and carries out reading or writing of signals by casting a light condensed by an objective lens onto the signal recording surface of the optical disc.

At first, the CD system was developed as a recording/reproducing system for digital audio data. As it has been popularly used, variations have been made to meet various purposes.

Particularly recently, since personal computers are broadly used as information processing means even in general households, a reproduction-only optical disc called CD-ROM (read only memory) has been popularly used as a recording medium for recording data handled by computers.

Also, as optical discs which enable recording of data while maintaining the reproduction compatibility with such a CD-ROM, a write-once optical disc like a CD-R (recordable) and a rewritable optical disc like a CD-RW (rewritable) have been developed and practically used.

Meanwhile, since the quantity of data handled by personal computers tends to increase more and more, it is strongly demanded to realize increase in the storage capacity of CD-ROM, CD-R, CD-RW and the like as recording media for recording such data.

To meet the above-mentioned demand, so-called double-density CD-R and CD-RW are being developed which have a recording density approximately twice that of the existing format while conforming to the CD format.

In the double-density CD-R and CD-RW, the recording density is increased to approximately twice that of the CD-R and CD-RW of the existing format (hereinafter referred to as normal-density CD-R and normal-density CD-RW) by realizing a narrower track pitch and a higher linear density, without changing the EFM modulation/demodulation system, the wobble signal frequency and the like employed in the existing normal-density CD-R and normal-density CD-RW. Moreover, the double-density CD-R and CD-RW employ an error correction system called CICR (cross interleave Reed-Solomon code), which is also employed in the existing normal-density CD-R and CD-RW. Thus, a higher recording density is realized while maintaining the compatibility with the normal-density CD-R and CD-RW without largely changing the circuit structure of the optical disc device.

Meanwhile, in the double-density CD-R and CD-RW having the recording density increased by a narrower track pitch and a higher linear density, the size of a defect such as a scratch on a recording mark is relatively larger than in the normal-density CD-R and CD-RW. That is, in the double-density CD-R and CD-RW, the burst error length is greater than in the normal-density CD-R and CD-RW.

Therefore, the double-density CD-R and CD-RW are more vulnerable to burst errors than the normal-density CD-R and CD-RW. If error correction with the CIRC employed in the existing normal-density CD-R and CD-RW is used as it is, there is a high probability that some errors cannot be corrected and that reading of data cannot be carried out appropriately.

In order to perform error correction for burst errors, it is effective to set a large delay parameter of the CIRC so as to elongate the interleave length. However, if the interleave length is set to be too long, many memories must be provided in the optical disc device which carries out error correction processing and there arises a problem of cost. Therefore, in the case of carrying out error correction processing with the CIRC for the double-density CD-R and CD-RW, it is required to set the delay parameter at an appropriate value.

The optical disc device is required not only to be capable of carrying out appropriate recording/reproduction of data to/from the double-density CD-R and CD-RW but also to have so-called compatibility to handle the existing normal-density CD-R and CD-RW.

SUMMARY OF THE INVENTION

In view of the foregoing status of the art, it is an object of the present invention to provide a data recording device and a data reproducing device which are capable of carrying out appropriate recording and reproduction of data to and from an optical disc having an increased recording density and which are also capable of handling an optical disc of the existing format, and to provide an optical disc having a high recording density in which appropriate error correction processing is carried out.

A data recording device according to the present invention is adapted for carrying out recording of data onto a first optical disc prescribed by a first standard and for carrying out recording of data onto a second optical disc prescribed by a second standard and having a higher recording density than the first optical disc. The device comprises: data input means to which data to be recorded is inputted; first interleave processing means for performing interleave processing with a first delay parameter on the data inputted to the data input means; second interleave processing means for carrying out interleave processing with a second delay parameter greater than the first delay parameter on the data inputted to the data input means; switching means for carrying out switching between the first interleave processing means and the second interleave processing means; data writing means for writing the data interleaved by the first interleave processing means or the second interleave processing means onto the optical disc; and disc discrimination means for discriminating whether the optical disc on which the data is written by the data writing means is the first optical disc or the second optical disc having a higher recording density than the first optical disc; wherein when it is determined by the disc discrimination means that the optical disc on which the data is written by the data writing means is the first optical disc, the switching means selects the first interleave processing means and the data writing means writes onto the first optical disc the data interleaved with the first delay parameter by the first interleave processing means; and wherein when it is determined by the disc discrimination means that the optical disc on which the data is written by the data writing means is the second optical disc having a higher recording density than the first optical disc, the switching means selects the second interleave processing means and the data writing means writes onto the second optical disc the data interleaved with the second delay parameter by the second interleave processing means.

A data recording device according to the present invention is adapted for carrying out recording of data onto a first optical disc prescribed by a first standard and for carrying out recording of data onto a second optical disc prescribed by a second standard and having a higher recording density than the first optical disc. The device comprises: data input means to which data to be recorded is inputted; interleave processing means for carrying out interleave processing on the data inputted to the data input means while switching a first delay parameter and a second delay parameter greater than the first delay parameter; switching means for controlling switching between the first delay parameter and the second delay parameter; data writing means for writing the data interleaved by the interleave processing means onto the optical disc; and disc discrimination means for discriminating whether the optical disc on which the data is written by the data writing means is the first optical disc or the second optical disc having a higher recording density than the first optical disc; wherein when it is determined by the disc discrimination means that the optical disc on which the data is written by the data writing means is the first optical disc, the switching means selects the first delay parameter and the data writing means writes onto the first optical disc the data interleaved with the first delay parameter; and wherein when it is determined by the disc discrimination means that the optical disc on which the data is written by the data writing means is the second optical disc having a higher recording density than the first optical disc, the switching means selects the second delay parameter and the data writing means writes onto the second optical disc the data interleaved with the second delay parameter.

A data reproducing device according to the present invention is adapted for carrying out reproduction of data interleaved with a first delay parameter from a first optical disc prescribed by a first standard and for carrying out reproduction data interleaved with a second delay parameter greater than the first delay parameter from a second optical disc prescribed by a second standard and having a higher recording density than the first optical disc. The device comprises: data reading means for read out the data from the first optical disc or the second optical disc having a higher recording density than the first optical disc; first deinterleave processing means for performing deinterleave processing on the data interleaved with the first delay parameter, read out from the first optical disc by the data reading means; second deinterleave processing means for performing deinterleave processing on the data interleaved with the second delay parameter, read out from the second optical disc by the data reading means; switching means for carrying out switching between the first deinterleave processing means and the second deinterleave processing means; data output means for outputting the data deinterleaved by the first deinterleave processing means or the second deinterleave processing means; and disc discrimination means for discriminating whether the optical disc from which the data is read out by the data reading means is the first optical disc or the second optical disc; wherein when it is discriminated by the disc discrimination means that the optical disc from which the data is read out by the data reading means is the first optical disc, the switching means selects the first deinterleave processing means and the data output means outputs the data deinterleaved by the first deinterleave processing means; and wherein when it is discriminated by the disc discrimination means that the optical disc from which the data is read out by the data reading means is the second optical disc, the switching means selects the second deinterleave processing means and the data output means outputs the data deinterleaved by the second deinterleave processing means.

A data reproducing device according to the present invention is adapted for carrying out reproduction of data interleaved with a first delay parameter from a first optical disc prescribed by a first standard and for carrying out reproduction data interleaved with a second delay parameter greater than the first delay parameter from a second optical disc prescribed by a second standard and having a higher recording density than the first optical disc. The device comprises: data reading means for read out the data from the first optical disc or the second optical disc having a higher recording density than the first optical disc; deinterleave processing means for carrying out first deinterleave processing in the case where the data read out from the optical disc by the data reading means is the data interleaved with the first delay parameter, and for carrying out second deinterleave processing in the case where the data read out from the optical disc by the data reading means is the data interleaved with the second delay parameter; switching means for controlling switching between the first deinterleave processing and the second deinterleave processing; data output means for outputting the data deinterleaved by the deinterleave processing means; and disc discrimination means for discriminating whether the optical disc from which the data is read out by the data reading means is the first optical disc or the second optical disc; wherein when it is discriminated by the disc discrimination means that the optical disc from which the data is read out by the data reading means is the first optical disc, the switching means selects the first deinterleave processing and the data output means outputs the data deinterleaved by the first deinterleave processing; and wherein when it is discriminated by the disc discrimination means that the optical disc from which the data is read out by the data reading means is the second optical disc, the switching means selects the second deinterleave processing and the data output means outputs the data deinterleaved by the second deinterleave processing.

An optical disc according to the present invention is adapted for having interleaved data recorded thereon. The optical disc has a data recording area in which data is recorded at a recording density that is substantially twice that of an optical disc prescribed by a predetermined standard; wherein data interleaved with a delay parameter 7/4 times that in the case of performing interleave processing on the data recorded on the optical disc prescribed by the predetermined standard is recorded in the data recording area.

BRIEF DESCRIPTION OF THE DRAWINGS

FIGS. 4A to 4E show a specific example of the pattern of a synchronizing signal "SYNC" of ATIP information on a normal-density optical disc. FIG. 4A shows the ATIP information. FIG. 4B shows a channel bit pattern in the case where the channel bit immediately before is "0". FIG. 4C shows a biphasic signal corresponding to the channel bit pattern of FIG. 4B. FIG. 4D shows a channel bit pattern in the case where the channel bit immediately before is "1".

FIG. 4E shows a biphasic signal corresponding to the channel bit pattern of FIG. 4D.

FIGS. 5A to 5E show a specific example of the pattern of a synchronizing signal "SYNC" of ATIP information on a double-density optical disc. FIG. 5A shows the ATIP information. FIG. 5B shows a channel bit pattern in the case where the channel bit immediately before is "0". FIG. 5C shows a biphasic signal corresponding to the channel bit pattern of FIG. 5B. FIG. 5D shows a channel bit pattern in the case where the channel bit immediately before is "1". FIG. 5E shows a biphasic signal corresponding to the channel bit pattern of FIG. 5D.

DESCRIPTION OF THE PREFERRED EMBODIMENTS

A preferred embodiment of the present invention will now be described in detail with reference to the drawings.

Figure 1:
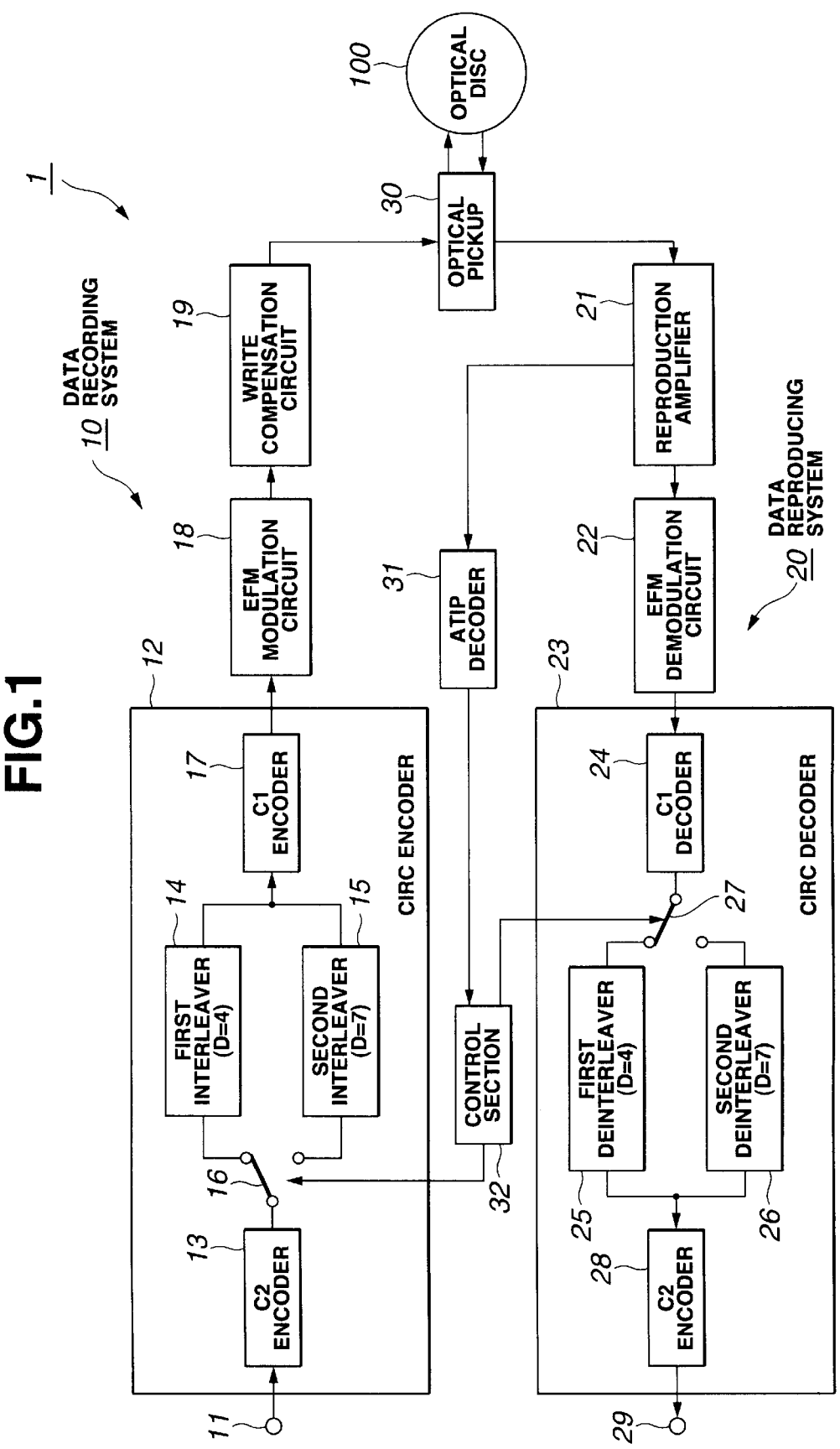
FIG. 1 is a block diagram showing an exemplary structure of an optical disc device to which the present invention is applied.

An exemplary structure of an optical disc device to which the present invention is applied is shown in FIG. 1. The optical disc device 1 shown in FIG. 1 is constituted to carry out recording and reproduction of data to and from an optical disc 100 like a CD-R or CD-RW conformable to the CD format, and employs a convolution-type double coding system called CIRC (cross interleave Reed-Solomon code) as a technique for error correction. The optical disc device 1 is constituted to handle both an optical disc of the existing format (hereinafter referred to as normal-density optical disc) and an optical disc having a recording density approximately twice that of the normal-density optical disc (hereinafter referred to as double-density optical disc).

In the double-density optical disc, the track pitch is narrower and the linear density is higher than in the normal-density optical disc. Specifically, the track pitch in the normal-density optical disc is set at approximately 1.6 $\mu$m, whereas the track pitch in the double-density optical disc is set at approximately 1.1 $\mu$m. Moreover, the normal-density optical disc has a minimum pit length (3T) of approximately 0.83 $\mu$m, whereas the double-density optical disc has a minimum pit length (3T) of approximately 0.62 $\mu$m, thus having a higher linear density. By thus narrowing the track pitch and improving the linear density, the double-density optical disc has a recording density that is approximately twice that of the normal-density optical disc, and is capable of recording data of a capacity that is approximately twice that of the normal-density optical disc, specifically, data of 1 GB or more.

The optical disc device 1 has a data recording system 10 for recording onto the optical disc 100 data supplied from a computer or the like on the host side, and a data reproducing system 20 for reproducing data recorded on the optical disc 100 and supplying the reproduced data to the computer or the like on the host side, as shown in FIG. 1.

An input terminal 11 is provided in the data recording system 10, so that data supplied from the computer or the like on the host side is inputted from the input terminal 11. The data inputted from the input terminal 11 is supplied to a CIRC encoder 12.

The CIRC encoder 12 has a C2 encoder 13, a first interleaver 14, a second interleaver 15, a switch circuit 16 for carrying out switching between the first interleaver 14 and the second interleaver 15, and a C1 encoder 17.

The data inputted from the input terminal 11 is first supplied to the C2 encoder 13. The C2 encoder 13 performs C2 coding on the supplied data and adds a parity Q of a Reed-Solomon code consisting of 4 symbols, for example, for each data unit consisting of 24 symbols. The data having the parity Q added thereto by the C2 encoder 13 is supplied to one of the first interleaver 14 and the second interleaver 15 that is selected by the switch circuit 16, and interleave processing performed thereon.

Interleave processing is processing for providing delays of 0, D, 2D, 3D, ..., 27D, for example, for the data of 28 symbols (24 symbols plus 4 symbols). D represents a delay parameter (unit delay quantity).

The first interleaver 14 has its delay parameter D set at "4" (frames). When supplied with the data having the parity Q added thereto, the first interleaver 14 performs interleave processing on the supplied data with a maximum delay of, for example, 108 frames (27×4 frames). On the other hand, the second interleaver 15 has its delay parameter D set at "7" (frames). When supplied with the data having the parity Q added thereto, the second interleaver 15 performs interleave processing on the supplied data with a maximum delay of, for example, 189 frames (27×7 frames).

The data interleaved by the first interleaver 14 or the second interleaver 15 is supplied to the C1 encoder 17. The C1 encoder 17 performs C1 coding on the interleaved data sequence and adds a parity Q of a Reed-Solomon code every plural data symbols.

The data, on which error correction coding using the CIRC has been carried out through the above-described processing, is supplied to an EFM modulation circuit 18, then modulated by EFM (eight-to-fourteen modulation) by the EFM modulation circuit 18, and supplied to a write compensation circuit 19. Then, a write signal from the write compensation circuit 19 is supplied to an optical pickup 30, and a signal corresponding to the recording data is recorded as a pit (mark) array on the optical disc 100 by the optical pickup 30.

The purpose of providing two interleavers 14 and 15 in the CIRC encoder 12 of the data recording system 10 of the optical disc device 1 is to carry out appropriate interleave processing for both the normal-density optical disc and the double-density optical disc. Specifically, in the optical disc device 1, in the case of recording data onto the normal-density optical disc, the first interleaver 14 is selected by the switch circuit 16 and interleave processing with a delay parameter D of "4" is performed on the data supplied to the first interleaver 14. In the optical disc device 1, in the case of recording data onto the double-density optical disc, the second interleaver 15 is selected by the switch circuit 16 and interleave processing with a delay parameter D of "7" is performed on to the data supplied to the second interleaver 15.

Figure 2:
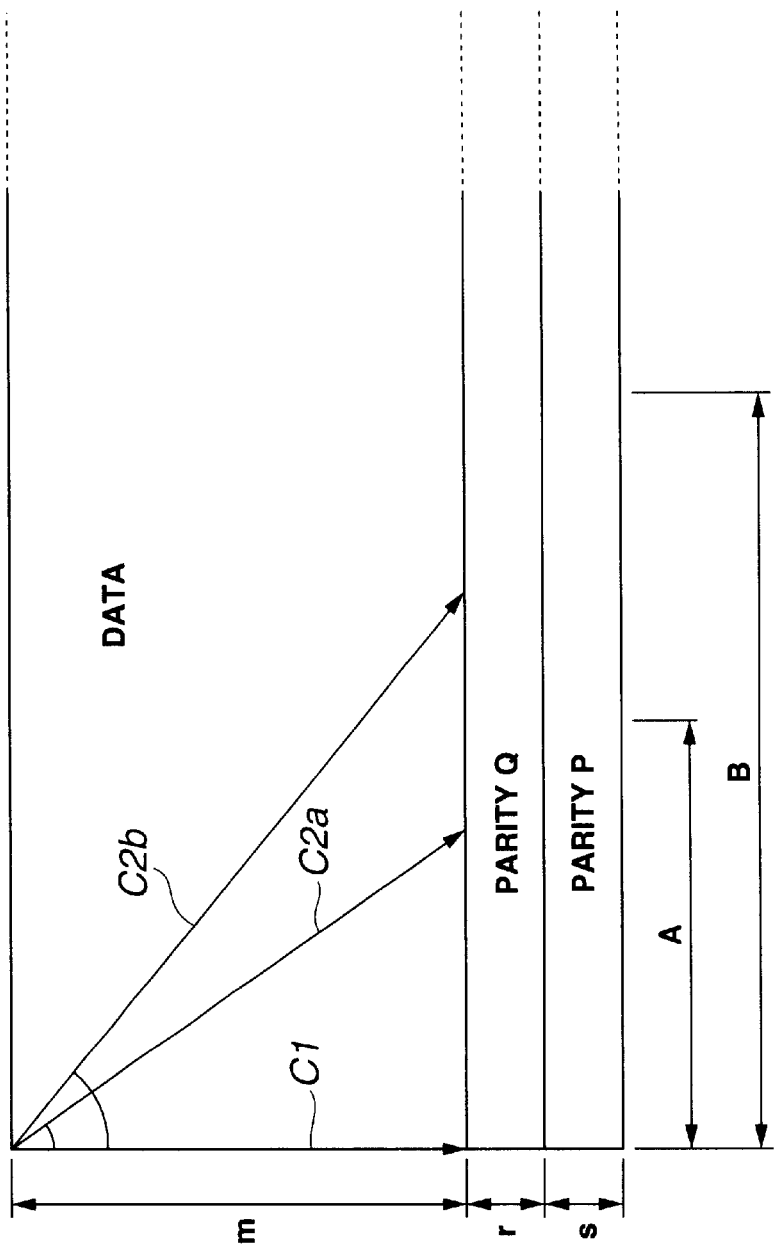
FIG. 2 illustrates error correction processing using a CIRC.

Error correction coding processing by the CIRC encoder 12 will now be described with reference to FIG. 2. In FIG. 2, m symbols constitute a data unit as an object of error correction coding processing, r symbols constitute a parity Q added through C2 coding processing by the C2 encoder 13, and s symbols constitute a parity P added through C1 coding by the C1 encoder 17.

In FIG. 2, slant lines C2a and C2b represent a data string to be C2-coded, and a vertical line C1 represents a data string to be C1-coded. The data string to be C2-coded is represented by the slant lines C2a and C2b because interleave processing is performed on the C2-coded data by the first or second interleaver 14 or 15. That is, if interleave processing by the first interleaver 14 is performed on the C2-coded data, the data string is in the direction indicated by the slant line C2a in FIG. 2. If interleave processing by the second interleaver 15 is performed on the C2-coded, the data string is in the direction indicated by the slant line C2b in FIG. 2.

In FIG. 2, inclinations θ1, θ2 of the slant lines C2a, C2b to the vertical line C1 correspond to the delay parameters D set for the first interleaver 14 and the second interleaver 15. As the delay parameter D of the first interleaver 14 is set at "4", the inclination of the slant line C2a to the vertical line C1 is θ1. As the delay parameter D of the second interleaver 15 is set at "7", the inclination of the slant line C2b to the vertical line C1 is θ2. In FIG. 2, A represents the maximum delay quantity (interleaver length) in the case where interleave processing is carried out by the first interleaver 14, and B represents the interleave length in the case where interleave processing is carried out by the second interleaver 15.

From FIG. 2, it is understood that the interleave length B in the case where interleave processing is carried out with the delay parameter D set at "7" is longer than the interleave length A in the case where interleave processing is carried out with the delay parameter D set at "4". This indicates that the correction capability for burst errors is improved by changing the delay parameter from "4" to "7".

Since the value of the delay parameter D and the interleave length are substantially proportional to each other, the interleave length is made approximately 7/4 times by changing the delay parameter D from "4" to "7". This is a heuristically found value, as an optimum value in the case of performing interleave processing on the data to be recorded onto the double-density optical disc. Specifically, when interleave processing was formed on the data to be recorded onto the double-density optical disc using a delay parameter set at "7", it was possible to secure the same correction capability for burst errors as in the case where interleave processing is performed on the data to be recorded onto the normal-density optical disc by using a delay parameter set at "4". If the delay parameter D is smaller than "7", the correction capability for burst errors is insufficient. If the delay parameter D is too large, a memory having a large capacity is required, raising the problem of cost. Thus, in carrying out interleave processing on the data to be recorded onto the double-density optical disc, the delay parameter D is set at "7".

Meanwhile, in the data reproducing system 20, a signal recorded as a pit (mark) array on the optical disc 100 is read out by the optical pickup 30 and supplied to a reproduction amplifier 21. The reproduction amplifier 21 generates a reproduction signal (RF signal), a focusing error signal, a tracking error signal and a wobble signal on the basis of the signal (photoelectrically converted voltage signal) supplied from the optical pickup 30.

The reproduction signal generated by the reproduction amplifier 21 is converted to digital data through a binarization circuit, a clock extraction circuit and the like, not shown, and is then supplied to an EFM demoulation circuit 22. The focusing error signal and the tracking error signal generated by the reproduction amplifier 21 are supplied to a servo control section, not shown. The servo control section carries out focusing servo and tracking servo in the optical pickup 30 on the basis of the focusing error signal and the tracking error signal.

The wobble signal from the reproduction amplifier 21 is supplied to an ATIP decoder 31. The wobble signal is a signal obtained from a wobbling groove on the optical disc 100. Specifically, a wobbling groove as a guide groove wobbling along the recording track is provided on an optical disc like as a CD-R or CD-RW, and FM-modulated position information, that is, time base information indicating the absolute position on the disc, is recorded by the wobbling of the wobbling groove. This information is called ATIP (absolute time in pregroove) information. With the optical disc like a CD-R or CD-RW, by decoding the wobble signal at the ATIP decoder 31 to obtain the ATIP information, the absolute position on the disc can be detected even in an unrecorded state.

In the optical disc device 1 to which the present invention is applied, the type of the optical disc 100 for recording or reproducing data, that is, whether the optical disc 100 for recording or reproducing data is a normal-density optical disc or a double-density optical disc, is detected from the pattern of a synchronizing signal of the ATIP information. This will be later described in detail.

The digital data (reproduction data) supplied to the EFM demodulation circuit 22 is EFM-demodulated by the EFM demodulation circuit 22 and is then supplied to a CIRC decoder 23.

The CIRC decoder 23 has a C1 decoder 24, a first deinterleaver 25, a second deinterleaver 26, a switch circuit 27 for carrying out switching between the first deinterleaver 24 and the second deinterleaver 26, and a C2 decoder 28.

The reproduction data from the EFM demodulation circuit 22 is first supplied to the C1 decoder 24. The C1 decoder 24 performs error correction with a C1 code on the supplied reproduction data. By this error correction with the C1 code, mainly random errors, which are minor errors, are corrected. The reproduction data on which error correction with the C1 code is performed by the C1 decoder 24 is supplied to one of the first deinterleaver 25 and the second deinterleaver 26 that is selected by the switch circuit 27.

The first deinterleaver 25 has its delay parameter D set at "4" and corresponds to the first interleaver 14 of the CIRC encoder 12. That is, the first deinterleaver 25 performs deinterleave processing on the reproduction data which is interleaved by the first interleaver 14, then recorded on the normal-density optical disc and then read out from the normal-density optical disc.

On the other hand, the second deinterleaver 26 has its delay parameter set at "7" and corresponds to the second interleaver 15 of the CIRC encoder 12. That is, the second deinterleaver 26 performs deinterleave processing on the reproduction data which is interleaved by the second interleaver 15, then recorded on the double-density optical disc and then read out from the double-density optical disc.

The reproduction data deinterleaved by the first deinterleaver 25 or the second deinterleaver 26 is supplied to the C2 decoder 28. The C2 decoder 28 performs error correction with a C2 code on the deinterleaved reproduction data. By this error correction with the C2 code, mainly burst errors, which are major errors, are corrected. The reproduction data on which error correction with the C2 code is performed by the C2 decoder 28 is outputted from an output terminal 29 and supplied to the computer or the like on the host side.

In the data reproducing system 20 of the optical disc device 1, the two deinterleavers 25 and 26 corresponding to the two interleavers 14 and 15 are provided, as described above. In ths optical disc device 1, in the case of reproducing the data which is interleaved with the delay parameter D set at "4" by the first interelaver 14 and is recorded on the normal-density optical disc, the first deinterleaver 25 is selected by the switch circuit 27 and deinterleave processing is carried out by the first deinterleaver 25. In the optical disc device 1, in the case of reproducing the data which is interleaved with the delay parameter D set at "7" by the second interleaver 15 and is recorded on the double-density optical disc, the second deinterleaver 26 is selected by the switch circuit 27 and deinterleave processing is carried out by the second deinterleaver 26.

In the optical disc device 1, as described above, the interleavers and the deinterleavers are switched depending on the case of carrying out recording/reproduction of data to/from the normal-density optical disc or the caser of carrying out recording/reproduction of data to/from the double-density optical disc, and appropriate interleave processing and deinterleave processing are carried out in accordance with the respective optical discs. Therefore, with the optical disc device 1, appropriate recording/reproducing operation can be carried out by restraining the reduction in the correction capability for burst errors, which is considered to be a problem in the double-density optical disc with a higher recording density, while appropriate recording/reproducing operation as in the conventional technique can also be carried out with respect to the normal-density optical disc.

In the optical disc device 1, the operation of each section is controlled by a control section 32. For example, the normal-density optical disc and the double-density optical disc are rotated by a spindle motor, not shown, and the operation of the spindle motor is controlled by the control section 32. For example, in the case of carrying out recording/reproducing operation to/from the normal-density optical disc, the spindle motor rotates the normal-density optical disc at a CLV (constant linear velocity) of 1.2 m/sec, and in the case of carrying out recording/reproducing operation to/from the double-density optical disc, the spindle motor rotates the double-density optical disc at a CLV of 0.9 m/sec.

The operation of the optical pickup 30 is also controlled by the control section 32. For example, the above-described focusing servo and tracking servo are also carried out under the control of the control section 32, and the control of the laser power or the like is also carried out by the control section 32. Moreover, the access operation to cause the optical pickup 30 to access a predetermined recording track is also carried out under the control of the control section 32. The access operation of the optical pickup 30 is appropriately carried, for example, as the control section 32 controls a thread motor and the like on the basis of the ATIP information obtained by decoding the wobble signal at the ATIP decoder 31.

Switching of the switch circuit 16 of the CIRC encoder 12 and switching of the switch circuit 27 of the CIRC decoder 23 are also carried out under the control of the control section 32. Specifically, for example, the control section 32 discriminates whether the optical disc 100 for recording or reproducing data is a normal-density optical disc or a double-density optical disc on the basis of the pattern of the synchronizing signal of the ATIP information obtained by decoding the wobble signal at the ATIP decoder 31, and carries out switching of the switch circuit 16 of the CIRC encoder 12 and switching of the switch circuit 27 of the CIRC decoder 23 in accordance with the result of discrimination.

Figure 3:
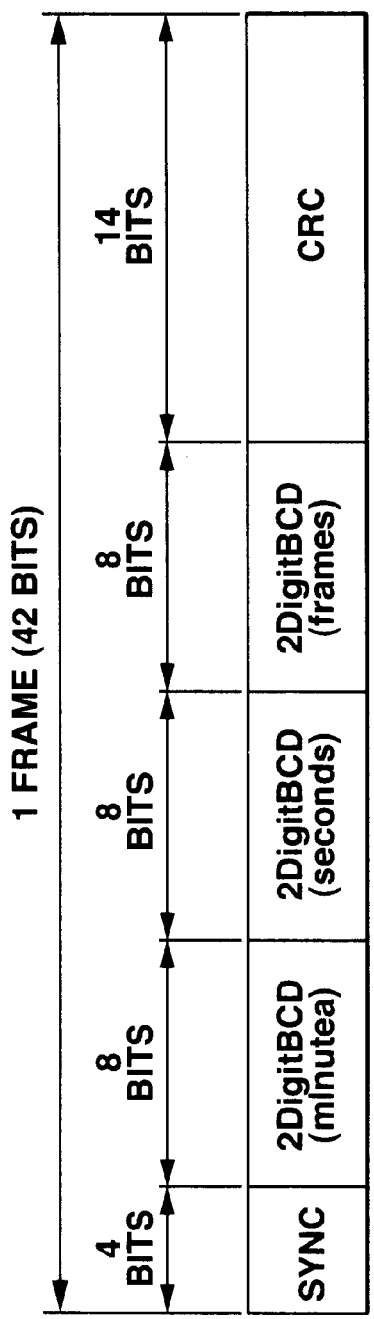
FIG. 3 shows the frame structure of ATIP information.

The ATIP information will now be described in detail. The frame structure of the ATIP information is as shown in FIG. 3. Specifically, one frame of the ATIP information consists of 42 bits. The first 4 bits represent a synchronizing signal "SYNC". Subsequently, time base information "minutes", "seconds" and "frames" are provided, each being represented by 2DigitBCD (8 bits). Moreover, a CRC (cyclic redundancy code) of 14 bits is added, thus constituting one frame. With respect to the optical disc 100 such as a CD-R or CD-RW, the synchronizing signal "SYNC" of the ATIP information is made different between the normal-density optical disc and the double-density optical disc.

A specific example of the pattern of the synchronizing signal "SYNC" of the ATIP information in the case of the normal-density optical disc is shown in FIGS. 4A to 4E.

The ATIP information shown in FIG. 4A is modulated by biphasic mark modulation, thereby having a channel bit pattern as shown in FIG. 4B or FIG. 4D. When the channel bit immediately before is "0", the synchronizing signal "SYNC" of the ATIP information has a channel bit pattern of "11101000" as shown in FIG. 4B and the biphasic signal after biphasic mark modulation has a waveform as shown in FIG. 4C. When channel bit immediately before is "1", the synchronizing signal "SYNC" of the ATIP information has a channel bit pattern of "00010111" as shown in FIG. 4D and the biphasic signal after biphasic mark modulation has a waveform as shown in FIG. 4E. That is, the pattern of the synchronizing signal "SYNC" of the ATIP information in the case of the normal-density optical disc is such that a 3T waveform and a 3T waveform of the reverse polarity are connected with a 1T waveform between them.

On the other hand, a specific example of the pattern of the synchronizing signal "SYNC" of the ATIP information in the case of the double-density optical disc is shown in FIGS. 5A to 5E.

The ATIP information shown in FIG. 5A is modulated by biphasic mark modulation, thereby having a channel bit pattern as shown in FIG. 5B or FIG. 5D. When the channel bit immediately before is "0", the synchronizing signal "SYNC" of the ATIP information has a channel bit pattern of "11100010" as shown in FIG. 5B and the biphasic signal after biphasic mark modulation has a waveform as shown in FIG. 5C. When channel bit immediately before is "1", the synchronizing signal "SYNC" of the ATIP information has a channel bit pattern of "00011101" as shown in FIG. 5D and the biphasic signal after biphasic mark modulation has a waveform as shown in FIG. 5E. That is, the pattern of the synchronizing signal "SYNC" of the ATIP information in the case of the double-density optical disc such that a 3T waveform and a 3T waveform of the reverse polarity are continuous each other.

As described above, with respect to the optical disc 100 such as a CD-R or CD-RW, since the pattern of the synchronizing signal "SYNC" of the ATIP information is made different between the normal-density optical disc and the double-density optical disc, the control section 32 can discriminate whether the optical disc 100 for recording or reproducing data is the normal-density optical disc or the double-density optical disc on the basis of the synchronizing signal of the ATIP information.

In the case where the control section 32 has determined that the optical disc 100 for recording or reproducing data is the normal-density optical disc, the control section 32 causes the switch circuit 16 of the CIRC encoder 12 to select the first interleaver 14 and causes the first interleaver 14 to perform interleave processing on the data to be recorded onto the normal-density optical disc. Also, the control section 32 causes the switch circuit 27 of the CIRC decoder 23 to select the first deinterleaver 25 and causes the first deinterleaver 25 to perform deinterleave processing on the data read out from the normal-density optical disc. On the other hand, in the cae where the control section 32 has determined that the optical disc 100 for recording or reproducing data is the double-density optical disc, the control section 32 causes the switch circuit 16 of the CIRC encoder 12 to select the second interleaver 15 and causes the second interleaver 15 to perform interleave processing on the data to be recorded onto the double-density optical disc. Also, the control section 32 causes the switch circuit 27 of the CIRC decoder 23 to select the second deinterleaver 26 and causes the second deinterleaver 26 to perform deinterleave processing on the data read out from the double-density optical disc.

As described above, in the optical disc device 1, the control section 32 discriminates whether the optical disc 100 for recording or reproducing data is the normal-density optical disc or the double-density optical disc on the basis of the pattern of the synchronizing signal "SYNC" of the ATIP information, and carries out switching of the switch circuit 16 of the CIRC encoder 12 and the switch circuit 27 of the CIRC decoder 23 in accordance with the result of discrimination. Therefore, discrimination of the optical disc is carried out appropriately and quickly, without providing a separate mechanism for disc discrimination as in the case of mechanically discriminating the optical disc, and optimum interleave processing and deinterleave processing can be carried out for the respective optical discs. Particularly, as in this embodiment, by discriminating the optical disc on the basis of the pattern of the synchronizing signal "SYNC" of the ATIP information, which is the signal from the wobbling groove formed in advance on the optical disc, discrimination of the optical disc can be appropriately carried out even in the case of recording data onto an unrecorded optical disc.

The method for discriminating the optical disc is not limited to the above-described example. For example, in reproduction, the disc may be discriminated on the basis of the difference in the frame synchronizing signal of the detected data.

As is described above in detail, according to the present invention, interleave processing and deinterleave processing are carried out with different delay parameters in accordance with the recording densities of optical discs as recording targets. Therefore, appropriate interleave processing and deinterleave processing can be carried out for an optical disc having a higher recording density so as to restrain the lowering of the correction capability for burst errors, while appropriate interleave processing and deinterleave processing can be carried out for an existing optical disc. Thus, application of the present invention enables realization of a recording/reproducing system which is capable of handling both the optical disc having a higher recording density and the existing optical disc.

What is claimed is:

1. A data recording device for carrying out recording of data onto a first optical disc prescribed by a first standard and for carrying out recording of data onto a second optical disc prescribed by a second standard and having a higher recording density than the first optical disc, the device comprising:
   data input means to which data to be recorded is inputted and producing output data;
   first interleave processing means for performing interleave processing with a first delay parameter on the output data from the data input means;
   second interleave processing means for carrying out interleave processing with a second delay parameter greater than the first delay parameter on the output data from the data input means;
   switching means for switching of the output data between the first interleave processing means and the second interleave processing means;
   data writing means for writing the data interleaved by the first interleave processing means or the second interleave processing means onto an optical disc; and
   disc discrimination means for discriminating whether the optical disc on which the data is to be written by the data writing means is the first optical disc or the second optical disc having a higher recording density than the first optical disc,
   wherein the first optical disc and the second optical disc have wobbled grooves, and
   the disc discrimination means discriminates whether the optical disc on which the data is written by the data writing means is the first optical disc or the second optical disc, on the basis of a synchronization pattern obtained by reading out wobbling information from the wobbled grooves, and
   when it is determined by the disc discrimination means that the optical disc on which the data is to be written by the data writing means is the first optical disc, the switching means selects the first interleave processing means and the data writing means writes onto the first optical disc the data interleaved with the first delay parameter by the first interleave processing means, and
   when it is determined by the disc discrimination means that the optical disc on which the data is to be written by the data writing means is the second optical disc having a higher recording density than the first optical disc, the switching means selects the second interleave processing means and the data writing means writes onto the second optical disc the data interleaved with the second delay parameter by the second interleave processing means.

2. The data recording device as claimed in claim 1, wherein the second optical disc has a recording density approximately twice the recording density of the first optical disc, and
   the second interleave processing means performs interleave processing on the output data with a second delay parameter which is 7/4 times the first delay parameter.

3. The data recording device as claimed in claim 1, wherein
   the disc discrimination means discriminates between the first optical disc and the second optical disc based on the synchronization pattern of an absolute time in a pregroove (ATIP) signal obtained by reading out wobbling information from the wobbled grooves.

4. The data recording device as claimed in claim 3, wherein the wobbled grooves on the first optical disc and the second optical disc having a higher recording density than the first optical disc are wobbled on the basis of position information.

5. The data recording device as claimed in claim 1, wherein the first optical disc has a track pitch of approximately 1.6 m and the second optical disc has a track pitch of approximately 1.1 m.

6. The data recording device as claimed in claim 1, wherein the first optical disc has a minimum pit length (3T) of approximately 0.83 m and the second optical disc has a minimum pit length (3T) of approximately 0.62 m.

7. A data recording device for carrying out recording of data onto a first optical disc prescribed by a first standard and for carrying out recording of data onto a second optical disc prescribed by a second standard and having a higher recording density than the first optical disc, the device comprising:
   data input means to which data to be recorded is inputted and producing output data;
   interleave processing means for carrying out interleave processing on the output data from the data input means while switching a first delay parameter and a second delay parameter greater than the first delay parameter;
   switching means for controlling switching between the first delay parameter and the second delay parameter;

data writing means for writing the data interleaved by the interleave processing means onto an optical disc; and disc discrimination means for discriminating whether the optical disc on which the data is to be written by the data writing means is the first optical disc or the second optical disc having a higher recording density than the first optical disc, wherein the first optical disc and the second optical disc have wobbled grooves, and the disc discrimination means discriminates whether the optical disc on which the data is written by the data writing means is the first optical disc or the second optical disc, on the basis of a synchronization pattern obtained by reading out wobbling information from the wobbled grooves, and when it is determined by the disc discrimination means that the optical disc on which the data is to be written by the data writing means is the first optical disc, the switching means selects the first delay parameter and the data writing means writes onto the first optical disc the data interleaved with the first delay parameter, and when it is determined by the disc discrimination means that the optical disc on which the data is to be written by the data writing means is the second optical disc having a higher recording density than the first optical disc, the switching means selects the second delay parameter and the data writing means writes onto the second optical disc the data interleaved with the second delay parameter.

8. The data recording device as claimed in claim 7, wherein the second optical disc has a recording density approximately twice the recording density of the first optical disc, and the interleave processing means performs interleave processing on the output data with a second delay parameter which is 7/4 times the first delay parameter, at the time of data recording to the second optical disc.

9. The data recording device as claimed in claim 7, wherein the disc discrimination means discriminates between the first optical disc and the second optical disc based on the synchronization pattern of an absolute time in a pregroove (ATIP) signal obtained by reading out wobbling information from the wobbled grooves.

10. The data recording device as claimed in claim 9, wherein the wobbled grooves on the first optical disc and the second optical disc having a higher recording density than the first optical disc are wobbled on the basis of position information.

11. The data recording device as claimed in claim 7, wherein the first optical disc has a track pitch of approximately 1.6 m and the second optical disc has a track pitch of approximately 1.1 m.

12. The data recording device as claimed in claim 7, wherein the first optical disc has a minimum pit length (3T) of approximately 0.83 m and the second optical disc has a minimum pit length (3T) of approximately 0.62 m.

13. A data reproducing device for carrying out reproduction of data interleaved with a first delay parameter from a first optical disc prescribed by a first standard and for carrying out reproduction data interleaved with a second delay parameter greater than the first delay parameter from a second optical disc prescribed by a second standard and having a higher recording density than the first optical disc, the device comprising:

data reading means for reading out data from the first optical disc or the second optical disc having a higher recording density than the first optical disc;

first deinterleave processing means for performing deinterleave processing on the data interleaved with the first delay parameter, read out from the first optical disc by the data reading means;

second deinterleave processing means for performing deinterleave processing on the data interleaved with the second delay parameter, read out from the second optical disc by the data reading means;

switching means for carrying out input switching between the first deinterleave processing means and the second deinterleave processing means;

data output means for outputting the data deinterleaved by the first deinterleave processing means or the second deinterleave processing means; and disc discrimination means for discriminating whether the optical disc from which the data is to be read out by the data reading means is the first optical disc or the second optical disc, wherein the disc discrimination means discriminates between the first and second optical discs based on a difference in a frame synchronizing signal of the data read by the data reading means, and when it is discriminated by the disc discrimination means that the optical disc from which the data is to be read out by the data reading means is the first optical disc, the switching means selects the first deinterleave processing means and the data output means outputs the data deinterleaved by the first deinterleave processing means, and when it is discriminated by the disc discrimination means that the optical disc from which the data is to be read out by the data reading means is the second optical disc, the switching means selects the second deinterleave processing means and the data output means outputs the data deinterleaved by the second deinterleave processing means.

14. The data reproducing device as claimed in claim 13, wherein the second optical disc has a recording density approximately twice the recording density of the first optical disc, and the second deinterleave processing means performs deinterleave processing on the data interleaved with a second delay parameter which is 7/4 times the first delay parameter.

15. The data reproducing device as claimed in claim 13, wherein the first optical disc has a track pitch of approximately 1.6 m and the second optical disc has a track pitch of approximately 1.1 m.

16. The data reproducing device as claimed in claim 13, wherein the first optical disc has a minimum pit length (3T) of approximately 0.83 m and the second optical disc has a minimum pit length (3T) of approximately 0.62 m.

17. A data reproducing device for carrying out reproduction of data interleaved with a first delay parameter from a first optical disc prescribed by a first standard and for carrying out reproduction data interleaved with a second delay parameter greater than the first delay parameter from a second optical disc prescribed by a second standard and having a higher recording density than the first optical disc, the device comprising:

data reading means for reading out data from the first optical disc or the second optical disc having a higher recording density than the first optical disc;

deinterleave processing means for carrying out first deinterleave processing when the data read out from the optical disc by the data reading means is the data interleaved with the first delay parameter, and for carrying out second deinterleave processing when the data read out from the optical disc by the data reading means is the data interleaved with the second delay parameter;

switching means for a data switching input between the first deinterleave processing and the second deinterleave processing;

data output means for outputting data deinterleaved by the deinterleave processing means; and disc discrimination means for discriminating whether the optical disc from which the data is to be read out by the data reading means is the first optical disc or the second optical disc, wherein the disc discrimination means discriminates between the first and second optical discs based on a difference in a frame synchronizing signal of the data read by the data reading means, and when it is discriminated by the disc discrimination means that the optical disc from which the data is to be read out by the data reading means is the first optical disc, the switching means selects the first deinterleave processing and the data output means outputs the data deinterleaved by the first deinterleave processing, and when it is discriminated by the disc discrimination means that the optical disc from which the data is to be read out by the data reading means is the second optical disc, the switching means selects the second deinterleave processing and the data output means outputs the data deinterleaved by the second deinterleave processing.

18. The data reproducing device as claimed in claim 17, wherein the second optical disc has a recording density approximately twice the recording density of the first optical disc, and has recorded thereon the data interleaved with a second delay parameter which is 7/4 times the first delay parameter.

19. The data reproducing device as claimed in claim 17, wherein the first optical disc has a track pitch of approximately 1.6 m and the second optical disc has a track pitch of approximately 1.1 m.

20. The data reproducing device as claimed in claim 17, wherein the first optical disc has a minimum pit length (3T) of approximately 0.83 m and the second optical disc has a minimum pit length (3T) of approximately 0.62 m.

* * * * *